June 5, 1962  G. R. TAYLOR  3,037,486
BOOT FOR BOOSTER UNIT
Filed Nov. 25, 1960

INVENTOR.
Garthwood R. Taylor
BY
HIS ATTORNEY

United States Patent Office 3,037,486
Patented June 5, 1962

3,037,486
BOOT FOR BOOSTER UNIT
Garthwood R. Taylor, Dayton, Ohio, assignor to General Motors Corporation, Detroit, Mich., a corporation of Delaware
Filed Nov. 25, 1960, Ser. No. 71,746
4 Claims. (Cl. 121—41)

This invention relates to a booster unit for a vehicle braking means and more particularly to a flexible porous boot operating as a filter in a brake booster unit.

The conventional brake booster unit operates through a differential of pressure operating on a pressure responsive member. A differential pressure within the booster unit is created by manually operating a valve mechanism which permits the changing of fluid pressure in one of the compartments causing the pressure responsive unit to move forwardly and operate the vehicle brakes. In the operation of a booster unit of this nature, it is necessary that a supply of air be available to the unit. The conventional booster unit employs a filter to purify air upon entrance to the booster unit. The conventional booster unit also provides a flexible boot providing a seal to prevent the entrance of foreign material into the booster unit and still permit relative movement of the manual control means relative to the casing of the booster unit.

Accordingly, this invention is intended to provide a boot means for permitting the relative movement of the manual means to the booster casing and also provide a filtering means for the incoming air to the booster unit.

It is an object of this invention to provide a porous flexible boot connecting the manual operating means and the housing of a booster unit.

It is another object of this invention to provide a boot on a booster unit which operates as a filter for the incoming air to the booster unit.

It is a further object of this invention to provide means connecting a manual control means to the casing of booster unit to permit relative movement between these parts and also provide a filter incorporated in the boot to purify the incoming air to the booster unit when the unit is in operation.

The objects of this invention are accomplished by employing a flexible porous boot on the booster unit. The boot is positioned in the normal location on a booster unit which connects the casing to a manual control means extending into the booster unit. The boot is flexible to permit relative movement of these two parts and also is constructed of a porous material to permit the entrance of air and filter foreign material from the air as the air enters the unit.

Further objects and advantages of the present invention will be apparent from the following description, reference being had to the accompanying drawings wherein preferred embodiments of the present invention are clearly shown.

Figure 1:
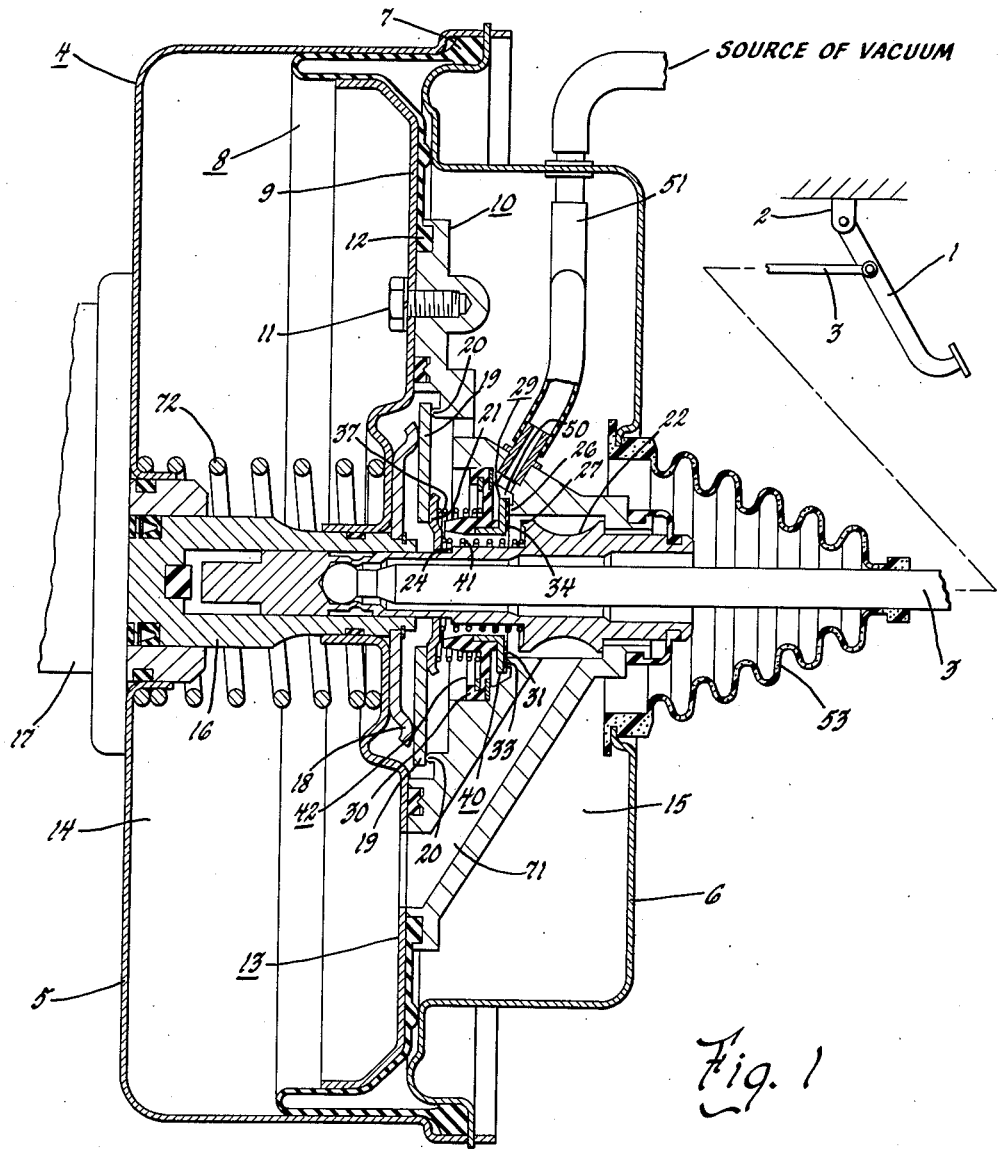
FIGURE 1 is a cross-section view of a booster unit illustrating the location of the flexible porous boot on the booster unit.

Referring to FIGURE 1, the manual control means includes a pedal 1 pivotally mounted on the chassis 2 and pivotally connected to the push rod 3. The push rod 3 extends into the booster unit to operate the valve means.

The booster unit 4 is adapted to pressurize fluid for the operation of the vehicle brakes. The booster unit includes a forward casing section 5 and the rearward casing section 6 fastened together to form a seal on the peripheral bead 7 of the diaphragm 8. The diaphragm 8 extends radially inward to form a seal with a diaphragm support 9 and the valve housing 10 which are fastened together by a plurality of bolts 11 forming a seal on the inner peripheral bead 12.

A power wall 13 forms a variable pressure chamber 14 and a constant pressure chamber 15 within the booster unit. The power wall is connected to a plunger 16 which extends forwardly into the master cylinder 17 and is adapted to pressurize fluid for operating vehicle brakes.

A reaction means is connected to the plunger 16 which includes the reaction plate 18 mounted on the rearward end of the plunger 16. The reaction plate operates against the plurality of fingers 19 which are pivoted on the fulcrums 20. The fingers also engage the reaction disk 21 on the inner periphery and transmit a reaction force which is received by the air valve 22 when the reaction disk 21 engages the shoulder 24. The air valve element 22 has a central opening extending forwardly from the rear end for reception of the push rod 3 which actuates the booster unit.

The valve means within the valve housing 10 includes the air valve element 22 which is concentrically located within the power wall 13 and the valve housing 10. The valve housing 10 forms a vacuum valve element 26. The air valve element 22 has an annular ridge 27 formed on a radial flange in the intermediate portion of the air valve element 22. A valve seat member 29 is mounted on a diaphragm 30. The outer periphery of the valve seat diaphragm 30 is mounted within an annular recess of the valve housing 10. The valve seat member 29 receives an annulus 31 which is bonded to a radial flange on the rearward side of the valve seat member 29. The annulus 31 forms a vacuum valve seat 33 and an air valve seat 34. The valve seat member 29 is biased to a rearward position by the spring 37 which contacts the vacuum valve seat 33 with the vacuum valve element 26 thereby maintaining a closed position for the vacuum valve. The vacuum valve considered as a unit will be designated by numeral 40.

The air valve element 22 is biased to a rearward position by the air valve spring 41. This places the air valve 42 in a normally open position when the booster is in the retracted position. The number 42 is designated as the air valve which includes the air valve element 22 and the air valve seat 33.

Figure 2:
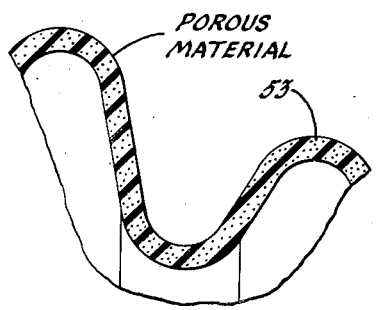
FIGURE 2 is an enlarged cross-section view of a portion of the boot illustrating the porosity of the boot.

The booster unit illustrated is of the air suspended type wherein the pressure responsive member or the power wall 13 is in its normally non-operating position wherein the variable pressure compartment 14 and the constant pressure compartment 15 are filled with air. The booster is actuated by evacuating the variable pressure compartment 14 on the forward side of the power wall 13. The vacuum chamber 50 is in communication with a source of vacuum through the conduit means 51. The constant pressure compartment 15 is in communication with the ambient air through the flexible filtering boot 53. The boot 53 grips the outer periphery of the push rod 3 and extends axially forward to grip the inner periphery of the rear casing section 6. This provides a flexible means to prevent the entrance of foreign air into the booster and also filters any air which is needed within the booster unit 4. FIGURE 2 is an enlarged cross-section view of the boot which is constructed of a porous material. The porous material may be any type of material which has porosity and the ability to filter a sufficient quantity of air to operate the booster unit. The material could be of a foam rubber or a plastic foam or any material which is resilient and provides a flexing means between the two elements with which it is connected.

The booster unit is operated by depressing the pedal 1 which moves the push rod 3 and operates the air valve element 22. Prior to operation of the booster, ambient pressure is within chambers 14 and 15. As the air valve element 22 is moved forwardly, it seats on the air valve element 34. Further forward movement of the air valve element 22 opens the vacuum valve seat 33 from the vacuum valve element 26 permitting vacuum to flow through the passage 71 into the variable pressure compartment 14. The evacuation of the variable pressure compartment 14 causes a differential pressure moving the power wall 13 forwardly to actuate the booster unit. This requires an increased volume of air in the constant pressure compartment 14. The entrance of this air is permitted by the porous nature of the boot 53 on the rearward end of the unit. The boot also flexes to permit the relative movement between the push rod 3 and the rear booster unit casing 6. Continued forward movement of the power wall causes the booster unit to actuate the vehicle brakes.

The unit is retracted by means of releasing the foot lever 1 which in turn permits rearward movement of the power wall 13 and also the air valve element 22 from the air valve seat. This permits the seating of the vacuum valve seat 33 on the vacuum valve element 26, closing the vacuum valve, and opening the air valve. When the air valve is open, there is communication between the variable pressure compartment 14 and the constant pressure compartment 15. This eliminates the vacuum on the forward side of the power wall 13 and returns the power wall to its normally retracted position due to the biasing force of the spring 72.

It is noted that the boot 53 provides the functions of permitting the relative movement of the push rod 3 relative to the rear casing section 6 and provides a dirt seal for these two relative moving parts. The boot also operates as a filter for incoming air to the booster unit. These functions are accomplished by a single element on the booster unit which previously required use of a separate filter mounted on a separate location on the unit.

While the embodiments of the present invention as herein disclosed constitute preferred forms, it is to be understood that other forms might be adopted.

What is claimed is as follows:

1. A brake booster unit comprising in combination, a casing means, a pressure responsive member within said casing means forming a variable pressure compartment and a constant pressure compartment, a force transmitting member connected to said pressure responsive member, a source of air pressure other than atmospheric pressure, valve means in said pressure responsive member, conduit means connecting said valve means with said source of air pressure, manual control means operating said valve means for controlling the pressure in said variable pressure compartment, and a flexible air filter member forming a dirt excluding boot connecting said manual means to said casing means to permit relative movement of said manual means relative to said casing means, and filter air admitted to said booster unit upon operation of said unit.

2. A filtering boot in a booster unit comprising in combination, a housing means, a pressure responsive member in said housing means forming a variable pressure compartment and a constant pressure compartment, a force transmitting member connected to said pressure responsive means, a valve means in said pressure responsive means, manual means operating said valve means, a source of air pressure other than atmospheric pressure, a source of atmospheric air pressure, conduit means connecting said source of pressurized air at atmospheric pressure to said valve means, second conduit means connecting said source of pressurized air at atmospheric pressure to said valve means, and a flexible porous air filter bellows type dirt excluding boot connecting said housing means to said manual means to provide filtering of incoming air of atmospheric pressure to said booster unit when said unit is in operation.

3. A filtering boot in a brake booster unit comprising in combination, a housing means, a pressure responsive means in said housing means separating the interior portion of said housing means into a variable pressure compartment and a constant pressure compartment, a force transmitting member connected to said pressure responsive member, a source of pressurized air at atmospheric pressure, a source of pressurized air at a pressure other than atmospheric pressure, valve means in said pressure responsive means for controlling the air pressure in said variable pressure compartment, conduit means connecting said source of pressurized air at other than atmospheric pressure to said valve means, manual means connected to said valve means for controlling the operation of said booster unit through said valve means, a foam rubber air filter bellows member forming a dirt excluding boot connecting said housing means to said manual means to provide a filtering medium for incoming air to said booster unit when said unit is in operation.

4. A filtering boot in a brake booster unit comprising in combination, a housing means, a pressure responsive unit forming a variable pressure compartment and a constant pressure compartment in said housing means, a force transmitting member connected to said pressure responsive member, a source of pressurized air other than atmospheric pressure, a source of pressurized air at atmospheric pressure, valve means in said pressure responsive means, conduit means connecting said source of pressurized air at a pressure other than atmospheric with said valve means, manual means connected to said valve means for controlling the pressure in the variable pressure compartment in said booster unit, a foam plastic material forming a flexible air filter dirt excluding boot connected to said housing means and said manual means to filter air entering said booster unit upon operation of said unit by said manual means.

References Cited in the file of this patent
UNITED STATES PATENTS

| | | |
|---|---|---|
| 2,828,719 | Ayers | Apr. 1, 1958 |
| 2,848,878 | Schnell | Aug. 26, 1958 |
| 2,968,926 | Randol | Jan. 24, 1961 |